(12) United States Patent
Dahlstedt

(10) Patent No.: US 6,970,893 B2
(45) Date of Patent: Nov. 29, 2005

(54) SYSTEM AND METHOD FOR REGENERATION OF METHODS AND GARBAGE COLLECTION OF UNUSED METHODS

(75) Inventor: Joakim Dahlstedt, Stockholm (SE)

(73) Assignee: BEA Systems, Inc., San Jose, CA (US)

( * ) Notice: Subject to any disclaimer, the term of this patent is extended or adjusted under 35 U.S.C. 154(b) by 190 days.

(21) Appl. No.: 10/162,308

(22) Filed: Jun. 4, 2002

(65) Prior Publication Data

US 2003/0131012 A1 Jul. 10, 2003

Related U.S. Application Data

(63) Continuation-in-part of application No. 10/111,566, filed as application No. PCT/SE00/02096 on Oct. 27, 2000.
(60) Provisional application No. 60/368,920, filed on Mar. 29, 2002.

(51) Int. Cl.[7] .............................................. G06F 17/38
(52) U.S. Cl. ....................................................... 707/206
(58) Field of Search ........................... 707/206; 714/20; 709/238; 717/128, 148; 719/317; 705/21

(56) References Cited

U.S. PATENT DOCUMENTS

| | | | |
|---|---|---|---|
| 5,088,036 A | 2/1992 | Ellis et al. ................... 395/425 |
| 5,355,483 A | 10/1994 | Serlet ......................... 711/154 |
| 5,652,883 A | 7/1997 | Adcock ....................... 707/206 |
| 5,745,705 A | * | 4/1998 | Iguchi ......................... 705/21 |
| 5,915,255 A | 6/1999 | Schwartz et al. ............ 707/206 |
| 5,946,487 A | * | 8/1999 | Dangelo ...................... 717/148 |
| 6,041,179 A | 3/2000 | Bacon et al. ................ 711/116 |
| 6,463,581 B1 | 10/2002 | Bacon et al. ................ 717/154 |
| 6,560,773 B1 | * | 5/2003 | Alexander et al. .......... 717/128 |
| 6,654,951 B1 | 11/2003 | Bacon et al. ................ 717/154 |
| 6,658,652 B1 | * | 12/2003 | Alexander et al. .......... 717/128 |

FOREIGN PATENT DOCUMENTS

WO WO99/32978 7/1999

OTHER PUBLICATIONS

Pascal Fradet, Collecting More Garbage, 1994, ACM, pp. 1–10.
Amitabh Srivastava, Unreachable Procedures in Object–Oriented Programming, 1992, ACM, pp. 1–10.

* cited by examiner

*Primary Examiner*—Diane D. Mizrahi
(74) *Attorney, Agent, or Firm*—Fliesler Meyer, LLP (57) ABSTRACT

The present invention provides a system and method for improving the effectiveness of a data processing application when using a virtual machine, where the program includes many methods, i.e. program sections, that are stored in the memory of the computer used, and where garbage collecting is used by said program. Thread stacks are first analyzed with respect to methods required thereby. Each of the methods required is caused to be regenerated where occurrent references to a method are replaced with reference to regenerated methods prior to the regeneration of a method. All non-regenerated methods are then erased, wherein the corresponding memory space is placed at the disposal of said program. Various means of locking and garbage collection can be used.

28 Claims, 5 Drawing Sheets

STOP & COPY:

FIG. 5

MARK & SWEEP:

FIG. 6

MARK & COMPACT:

SYSTEM AND METHOD FOR REGENERATION OF METHODS AND GARBAGE COLLECTION OF UNUSED METHODS

CROSS REFERENCE TO RELATED APPLICATIONS

This application is a continuation-in-part of "SYSTEM AND METHOD FOR REGENERATION OF METHODS AND GARBAGE COLLECTION OF UNUSED METHODS". This application is a Continuation-in-part of U.S. application Ser. No. 10/111,566 filed Oct. 31, 2002 which is the National Stage of International Application No. PCT/SE00/02096 filed Oct. 27, 2000, and also claims benefit of 60/368,920 Mar. 29, 2002. All of the above applications are incorporated herein by reference.

FIELD OF THE INVENTION

The invention relates to a method of improving the effectiveness of a data processing application when using a virtual machine, where the program includes many methods.

BACKGROUND

In a computer system, the ability to control the allocation of memory resources is vital to the successful operation and scalability of the computer system as a whole. Software applications run more efficiently in environments in which steps are taken to proactively manage available memory resources to ensure that only those entities that are currently being used are stored in memory, while little-used entities are cleanly removed. Such memory management techniques have commonly been applied to object management, including the Java language, and other object-oriented environments. Many memory management techniques can be designed to be automatic, or to allow a developer control over the allocation. Java and other dynamic program languages include an automatic memory management. This means that the programmer need not keep an account of those parts of the memory that are used. The virtual machine carries out a so-called garbage collection from time to time, meaning, in principle, that the virtual machine scans the entire memory and finds which objects have been stored in the memory and which objects the program can no longer address. These parts of the memory are returned for later use.

Java also includes a built-in thread management system for supporting or simulating the simultaneous processing of two or more processes/activities. The thread management system is responsible for allocating memory resources to each thread, and deciding which threads shall be run, and which threads shall be made passive.

However, in order to further increase effectiveness and place occupied memory space at the disposal of the program, it is not sufficient to solely optimize the memory with respect to the objects. Additional mechanisms are required when the program includes many methods, to better optimize the arrangement of methods within the memory space.

SUMMARY OF THE INVENTION

The present invention relates to a system and method of improving the effectiveness of a data processing application when using a virtual machine, where the program includes many methods, i.e. program sections, that are stored in the memory of the computer used, and where garbage collecting is used by said program, wherein the inventive method is characterized by a first step in which all so-called thread stacks are analyzed with respect to methods required thereby; a second step in which each of the methods required is caused to be regenerated where occurrent references to a method are replaced with reference to regenerated methods prior to the regeneration of a method; and by a third step in which all non-regenerated methods are erased, wherein the corresponding memory space is placed at the disposal of said program.

More specifically, the invention is concerned with increasing the data processing rate in virtual machines, and then particularly with respect to the Java program language.

The invention is not restricted to Java, but can be applied with many program languages, although the invention is described below primarily with reference to Java.

The system and methods provided by the invention are intended for use with adaptive optimization of a program. In adaptive optimization, the program is restructured and different parts of the program are optimized as the program is run. Increased data processing capacity results in the rapid creation of new memory sites, since the longer the program is run, the more memory space is required. The invention provides a mechanism to best utilize this memory space.

In one embodiment the invention comprises a process for deciding which methods (and in some cases which versions of the methods thereof) should be kept in memory, and optimizing the distribution of those methods within the memory space of a computer system or virtual machine, comprising the steps of: determining a selection of methods to be regenerated; creating regenerated methods, and replacing references to each method with references to the regenerated method; and, erasing all non-regenerated methods and releasing the memory space occupied by those non-regenerated methods. The above step of determining includes analyzing thread stacks associated with each method.

DETAILED DESCRIPTION

As described above, Java and other dynamic program languages include an automatic memory management. The virtual machine carries out a so-called garbage collection from time to time, meaning, in principle, that the virtual machine scans the entire memory and finds which objects have been stored in the memory and which the program can no longer address. These parts of the memory are returned for later use. Java also includes a built-in thread management system. In such a system, threads form the core entities upon which applications execute and communicate with the server. Thus, Java incorporates a system for supporting or simulating the simultaneous processing of two or more activities/processes.

However, in order to further increase effectiveness and to place occupied memory space at the disposal of the program, it is not sufficient to solely optimize the memory with respect to the objects. Additional mechanisms are required when the program includes many methods, to better control the distribution of methods within the memory space, and to decide which methods (and in some cases which versions of the methods) should actually be kept in memory. This leads to a more optimal arrangement of methods within the memory space of a computer system or virtual machine. The present invention addresses this problem.

The present invention thus relates to a method of improving the effectiveness of a data processing application when using a virtual machine, where the program includes many methods, i.e. program sections, that are stored in the memory of the computer used, and where garbage collecting is used by said program. In one embodiment, the method is characterized by a first step in which all so-called thread stacks are analyzed with respect to methods required thereby; a second step in which each of the methods required is caused to be regenerated where occurrent references to a method are replaced with reference to regenerated methods prior to the regeneration of a method; and by a third step in which all non-regenerated methods are erased, wherein the corresponding memory space is placed at the disposal of said program.

The present invention will now be described in more detail partly with reference to an exemplifying embodiment of the invention shown on to the accompanying drawings.

Figure 1:
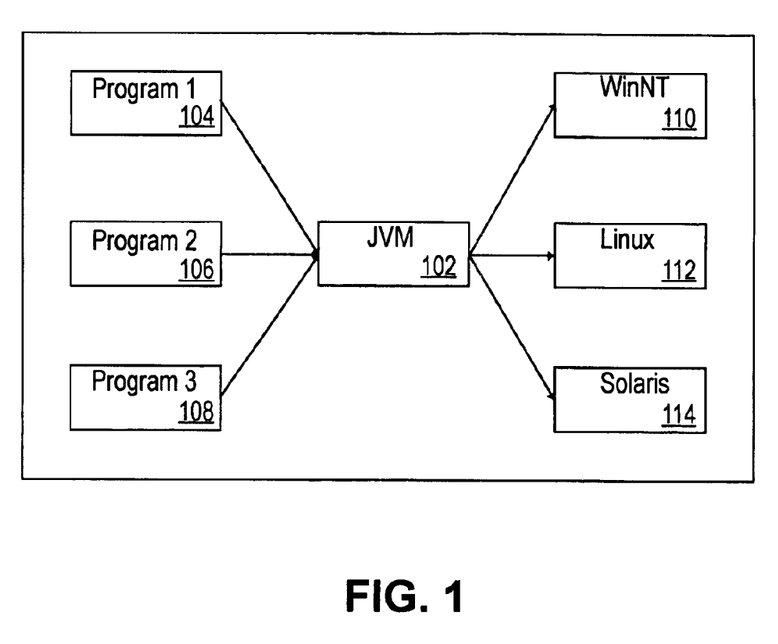
FIG. 1 is a block diagram showing the placement of a Java virtual machine in a typical environment.

FIG. 1 shows that a Java virtual machine (JVM) 102 can be used to run different data programs 1, 2, 3 (indicated as 104, 106, 108, respectively), regardless of whether the operating system is, for example, WinNT 110, Linux 112, Solaris 114 or some other type of system. As mentioned above, although Java is a very popular program language, the present invention is not restricted to this language but can be applied to all object-oriented corresponding program languages.

The present invention thus relates to a system and method of improving the effectiveness of a data processing application when using a virtual machine, wherein the program includes a large number of methods, i.e. program sections, that are stored in the memory of the computer used, and wherein a garbage collecting process is used by the program.

It is previously known to garbage collect objects and therewith erase objects that are no longer in current use by thereby placing corresponding memory capacity at the disposal of the system.

In large systems, many methods, i.e. program sections, are used one or a few times, or methods are applied for a short period of time and then left unused.

In the case of Java and corresponding programs, new methods are loaded and old methods left unused.

Furthermore, adaptive optimization results in the optimization and re-optimization of methods placed in the memory, where old methods are left unused.

When performing optimizations that select the most appropriate locking mechanisms, or when the garbage collector is adaptively changed, it is necessary to replace all of the previous methods that utilized the older mechanisms with new methods utilizing the new mechanisms.

Generally described, the invention first identifies methods to be regenerated. According to an embodiment of the invention, all so called thread stacks are analyzed with respect to the methods required, in a first step of the inventive method. In a second step, each of the methods required is regenerated, where occurrent references to a method are replaced with references to regenerated methods prior to said regeneration. In a third step, all non-regenerated methods are erased and the corresponding memory space placed at the disposal of the program.

This procedure does not only clean out unused methods, but also results in a reorganization between those methods that have been regenerated, so as to direct any references to the original methods immediately to appropriate regenerated methods instead of proceeding via an old method that is no longer used.

Figure 2:
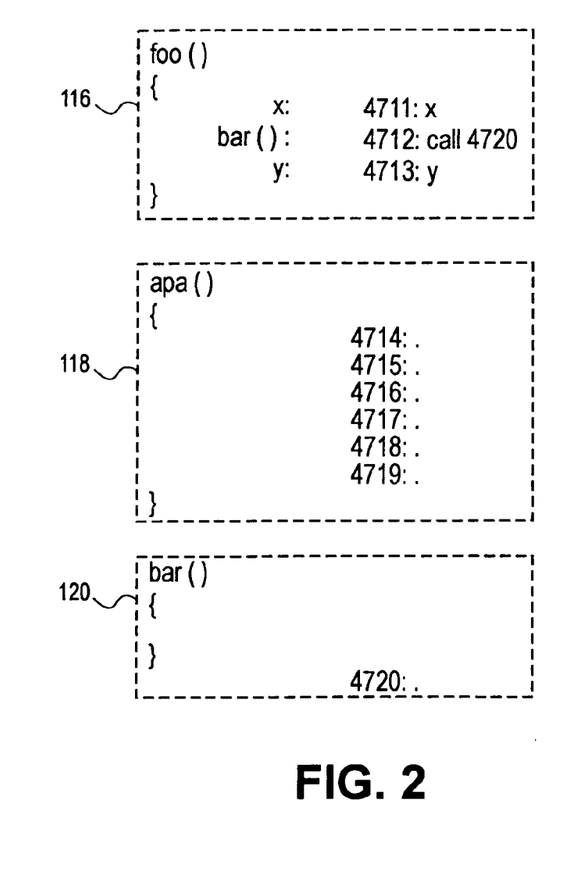
FIG. 2 illustrates an example of methods prior to regeneration.
Figure 3:
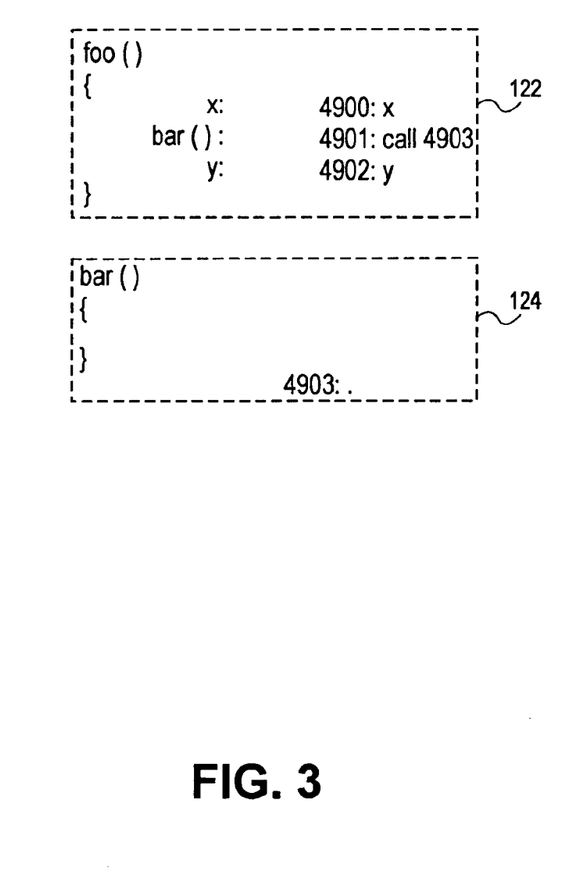
FIG. 3 illustrates methods regenerated in accordance with the invention.

This is illustrated in the example of FIGS. 2 and 3, in which example methods foo and bar are used for illustration. It will be evident to one skilled in the art that the Java-based foo and bar methods shown in FIGS. 2 and 3 are given for purposes of illustrating the regeneration and garbage collection features of the invention, and that the invention is not limited solely to the types of methods herein, but can be used with a wide variety of method-based systems.

FIG. 2 illustrates the old or original methods, and FIG. 3 illustrates the regenerated methods. Three methods foo 116, apa 118 and bar 120 are shown in FIG. 2. In the example shown, the foo method 116 starts at the memory address 4711. The apa method 118 starts at the address 4714, and bar method 120 starts at the address 4720.

In this example, analysis of the thread stacks shows that only the methods foo and bar are used and consequently foo and bar have not been referenced to the method apa.

FIG. 3 illustrates how the methods foo and bar are regenerated to provide new methods. In the example illustrated in FIG. 3, the new methods foo 122 and bar 124 are recreated precisely to match their original predecessors, although with the difference that the new methods obtain new addresses. In the example shown,the foo reference to bar now points to the new bar address 4903.

All of the old methods, i.e. the methods foo 116, apa 118 and bar 120 shown in FIG. 2, can now be erased and the memory spaces previously occupied by these methods vacated for further use.

When garbage collection of objects takes place, running the program normally stops while garbage collection takes place. Running of the program is restarted subsequent to the garbage collection and to the erasure of objects that are not in use.

Such a method can be used when applying the present invention.

However, the following method is preferable.

When practicing the inventive method, one thread is stopped at a time whilst the program is running, wherewith methods used for a stopped thread are selectively transferred to a list and the thread then restarted. The methods in the list are then regenerated and stored. All threads are later caused to be stopped at the same time, subsequent to having treated all threads this way, namely so that all used methods relating to the threads concerned have been regenerated. All methods that have not been regenerated are erased and all threads are restarted with the regenerated methods.

This method obviates the need to stop running the program, since the regeneration takes place intermittently.

As before mentioned, lock mechanisms are used in Java and corresponding languages. Different lock mechanisms can be selected. The important thing is typically to select the lock mechanism that is the most effective. For example, in some cases this may mean preventing more than one thread having access to a given object at the same time as another thread. In other cases, for example, if there is no contention on a lock, then a thin lock-based mechanism may be preferred over an inflated or fat-lock mechanism A synchronization problem exists when several threads desire access to one and the same object or source. In order to solve this problem in Java, each thread endeavors to reach the source lock. The lock mechanism can be implemented in various ways. The effectiveness of different lock mechanisms will depend on how threads endeavor to obtain access to the locks and whether different threads try to access the same synchronized sources.

According to a preferred embodiment, when locking mechanisms are used the most effective locking mechanisms are identified in a step prior to said first step, and the methods that use a thus identified locking mechanism are regenerated.

With respect for garbage collecting algorithms, these also need to be selected. Many object oriented languages use garbage collection. This means that the programmer need not instruct the system explicitly that a certain object is no longer required. The system is responsible for this detection, and reclaims the part of the memory occupied by the object. A number of different algorithms have been proposed for effective implementation of this detection and reclaim. It has been found that different algorithms are best for different applications. The choice of the best garbage collecting algorithm for the program application being run is highly significant in achieving maximum execution rate in respect of the program concerned.

According to another preferred embodiment of the invention, when different garbage collecting algorithms are used the allocation and length of life of the various objects are determined in a step prior to said first method step, whereafter the most effective garbage collecting algorithm is caused to be identified and methods that are dependent on the requisite garbage collecting algorithms are regenerated and remaining garbage collecting algorithms then erased.

Application of the preferred embodiments provides a highly effective method for optimizing methods, thread management, and memory management, where a generic feature resides in the identification and regeneration of methods so as to not load the system with unused methods.

Locking Mechanisms

In some instances the invention can be used to help determine the best locking mechanism to be used with a particular method. In accordance with one embodiment of the invention, the JVM or run-time environment may employ various locking mechanisms by which the resource that provides a requested method is locked for use by the application program. For example, in many cases the program will be able to achieve a faster lock on a particular method using an uncontended lock mechanism (sometimes referred to as a "thin lock"). However, in other cases the program may be able to achieve a faster lock on another method using a contended lock mechanism (for example an "inflated" or "fat" lock). Since the invention allows regeneration of a method that uses a different locking mechanism, it can keep those methods or those versions of the methods that use the best locking mechanism, and delete the others. In this way the method may be modified by the JVM so that, for example, when a request is received to access a particular source lock, the system guesses that this particular source lock request requires, e.g. a fat lock. The system then attempts to try a fat lock and access the method. Following a successful attempt, the program returns to process the next request; otherwise the thread waits on the source lock to be released.

Garbage Collection Mechanisms

In accordance with the invention, the process of garbage collection of unused methods is actually a two-fold process, requiring a first phase of adaptive optimization, and a second phase of garbage collection of unused methods. While described below are various garbage collection methods that can be used with the invention, it will evident to one skilled in the art that additional types of garbage collection methods can be used within the spirit and scope of the invention.

Figure 4:
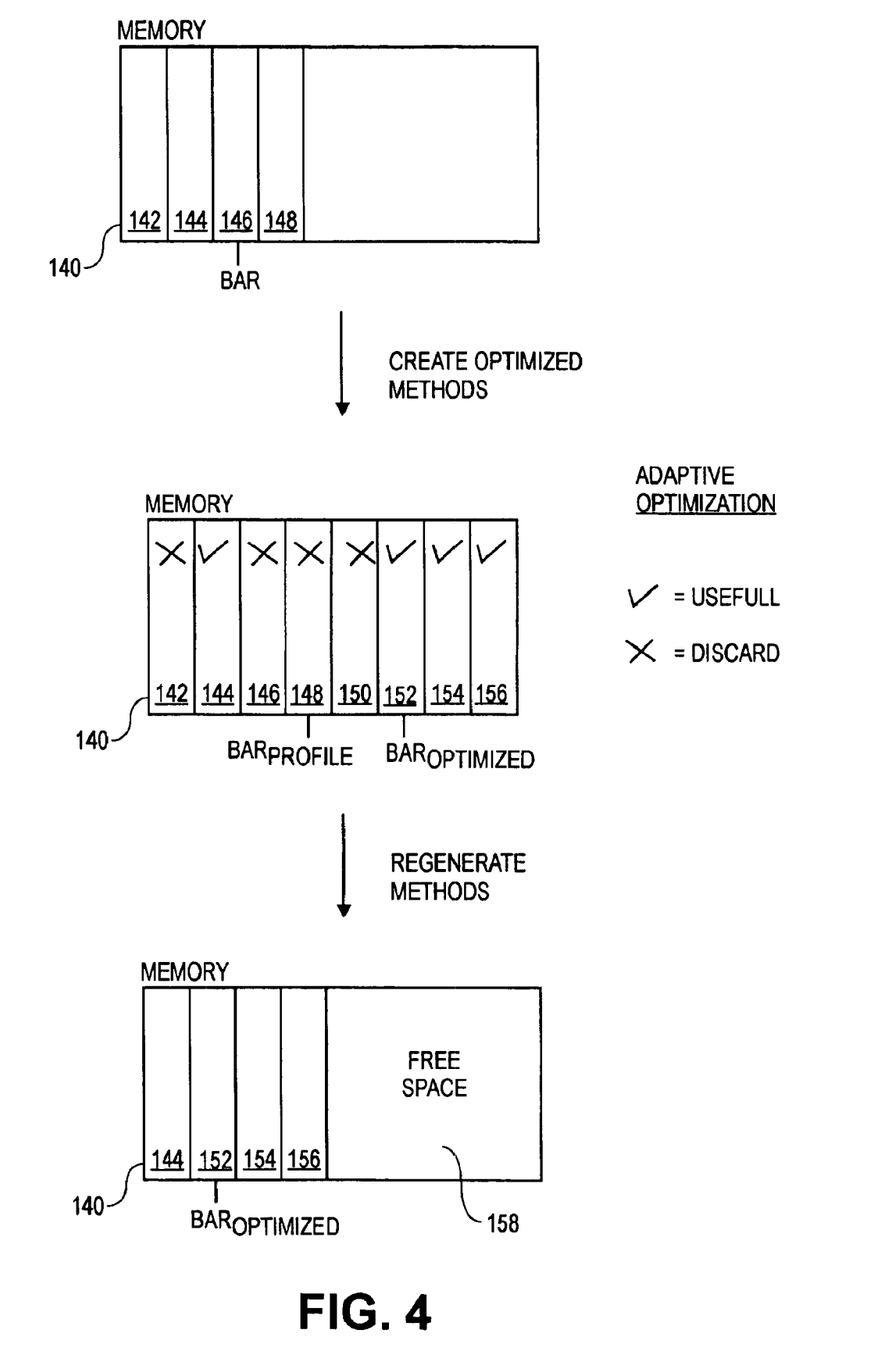
FIG. 4 illustrates a garbage collection process in which adaptive optimization is used to create a set of regenerated methods.

FIG. 4 illustrates the first phase of the garbage collection process in which adaptive optimization is used by a system to create a set of regenerated methods for use by an application or program, such as by a Java program in a JVM environment. The system includes a plurality of threads, which execute to allow the Java program to access methods. As shown in FIG. 4, the memory space 140 of the system typically includes a number of methods 142, 144, 146, and 148, each of which is executing in a thread. As is common in a runtime environment, a given method, for example a foo method (not shown) may reference another method, for example the bar method 146 shown in FIG. 5. While the system is operating normally, if it detects that the bar method is used frequently, it can create additional copies of this method to satisfy this demand. Each new copy of the bar method then executes in its own thread. So for example, in FIG. 4 additional (new) methods or copies of (older) methods 150, 152, 154 and 156 are created in the memory space of the system. When an individual method call this same method, the new method may be specially created to suit that particular method, in which case it is often referred to as a $bar_{profile}$. Sooner or later, one of the $bar_{profiles}$ will be found to be more optimized than the others, i.e. it is perhaps in an optimal position, perhaps for faster speed of operation, or minimal resource usage. In the example shown in FIG. 4, a number of bars are shown including $bar_{profile}$ 148 and the eventual $bar_{optimized}$ 152. The result of the adaptive optimization phase is to create a set of $bar_{optimized}$, and additional methods, which are of most use to the application and should be kept after regeneration. The system determines that other methods are either not being used, or are not optimal such that they can be discarded after regeneration. For example, in the example shown in FIG. 4, the system may determine that methods 144, 152, 154, and 156 are useful and should be kept following the garbage collection process. The additional methods 142, 146, 148, and 150 can be discarded. The final step in adaptive optimization is to regroup the methods associated that are still being used in a uniform manner, so that memory space previously occupied by the methods that are no longer considered useful, can be freed up for further use. As shown in FIG. 4, those methods previously selected as being useful (marked in FIG. 5 with a ✓ symbol), including 144, 152, 154 and 156, which in this example includes the $bar_{optimized}$ method 152 are moved to one portion of the memory space, while unused methods (marked in FIG. 5 with a χ symbol) are either not moved or are deleted, freeing up a substantial portion 158 of the memory space for use in creating new methods.

Figure 5:
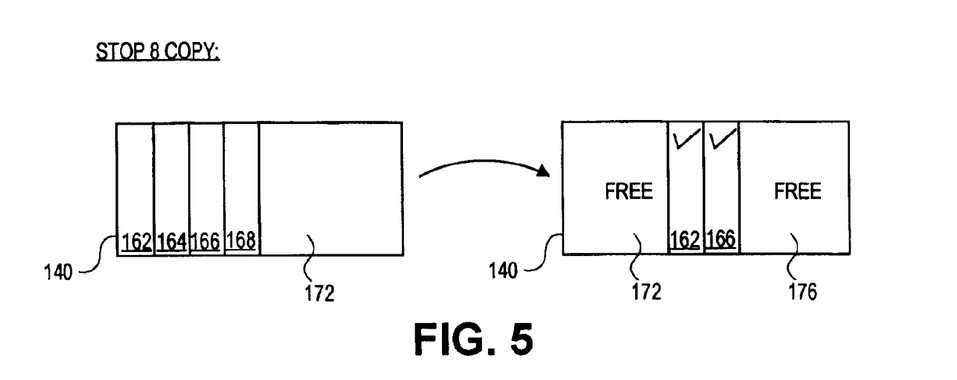
FIG. 5 illustrates a stop and copy method of garbage collection.
Figure 6:
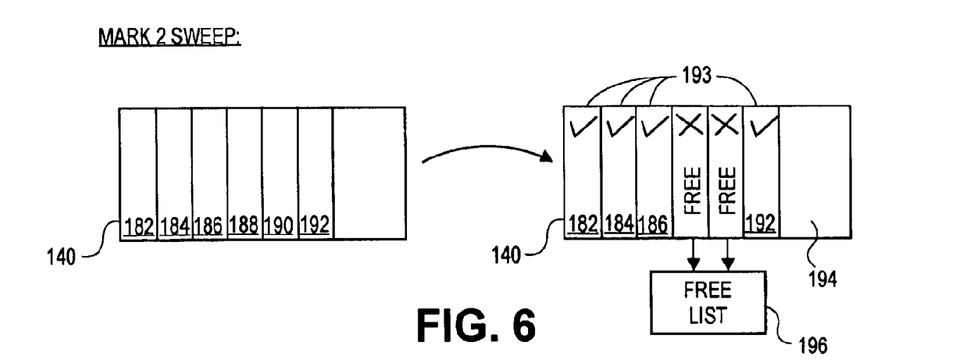
FIG. 6 illustrates a mark and sweep method of garbage collection.
Figure 7:
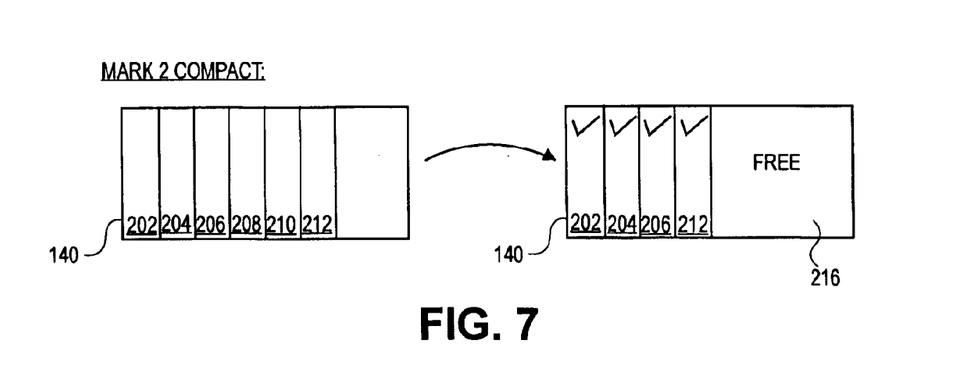
FIG. 7 illustrates a mark and compact method of garbage collection that can also be used with the invention.

The actual process of moving the methods to a single portion of the memory space and freeing up the rest of the memory space is commonly referred to as garbage collection. FIGS. 5, 6 and 7 illustrate various mechanisms of garbage collecting that can be used with the invention, although it will be evident to one skilled in the art that additional garbage collection mechanisms can be used to free up space previously occupied by now non-regenerated methods.

FIG. 5 illustrates a stop and copy method of garbage collection. As shown in FIG. 5, the thread structure 140 includes a number of methods 162, 164, 166, and 168 together with an available memory space 172. The stop and copy method stops the execution of all threads, and moves all of the methods that are considered to be useful, for example in this case 162 and 166 to the available free space 172. The space 174 previously occupied by all of the methods now becomes totally free, including the space 176 left over from the move operation. In this way the methods that are still in use are kept, while the space that was previously used by the now non-useful methods is freed up. One of the limitations of this mechanism is that twice as much space as the total available space must be used as a transitory copy space for this system.

FIG. 6 illustrates a mark and sweep method of garbage collection. As shown in FIG. 6, the entire virtual memory space is used for the execution of threads providing methods 182, 184, 186, 188, 190, and 192. During the garbage collection process those methods that are identified as being still useful including 182, 184, 186, and 192 are marked 193 as being still in use. Methods that are deemed by the system to be no longer useful are marked as free, and are added to a free list 196. The free list is then used by new threads to find locations at which to insert newly generated methods. In this way the system frees up space for further use. One of the advantages of this type of systems is that the methods themselves do not need to be moved.

FIG. 7 illustrates a mark and compact method of garbage collection that can also be used with the invention. As shown in FIG. 7, the memory space 140 includes methods 202 through 212. Similar to a combination of both the stop and copy, and the mark and sweep methods, a system that uses a mark and compact method of garbage collection marks those methods that are useful, but then instead of merely deleting the unused methods, moves all of the marked useful methods to a contiguous space of the memory space, freeing up a substantial portion of contiguous free space 216 for further use.

Application Server Implementation

Figure 8:
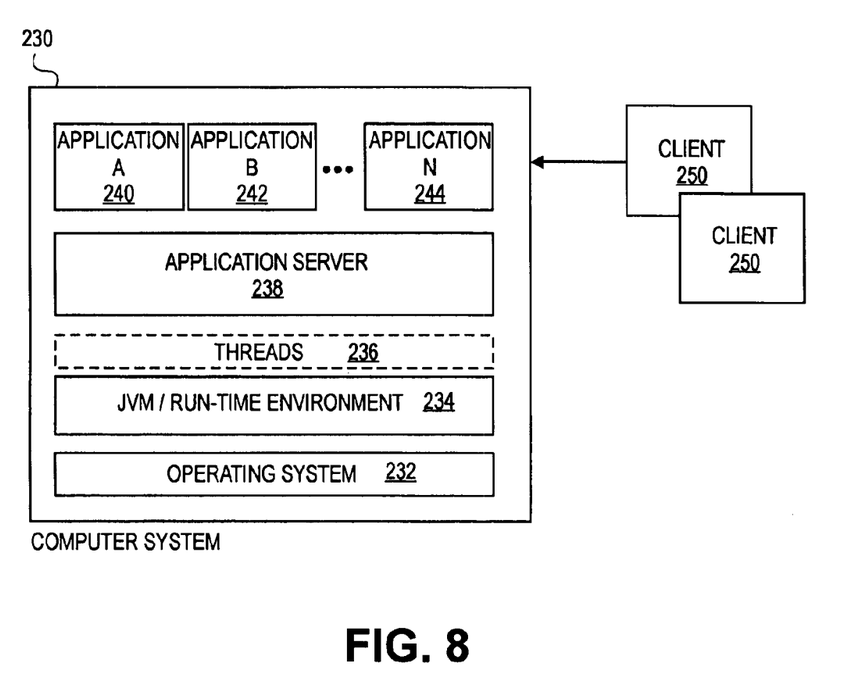
FIG. 8 illustrates how the invention can be used in an application server environment.

FIG. 8 illustrates how the invention can be used in an application server environment to optimize the ability of the application server and applications either running thereon or in communication with the application, and allows the server to make the most of the JVM or run time environment. As shown in FIG. 8, the computer system 230 typically includes an operating system 232 upon which a virtual machine (such as a JVM or run time environment) exists 234. The application server 238 sits upon this JVM run time environment 234. Threads 236 are used to provide the infrastructure between the application server and the run time environment to service requests from applications 240, 242, and 244.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A process for optimizing the distribution of software methods within the memory space of a computer system or virtual machine, wherein said virtual machine includes one or more threads, comprising the steps of:

determining, within a set of methods originally distributed within the memory space of said virtual machine, a selection of said methods to be regenerated, wherein said step of determining includes analyzing the thread stacks to determine those methods currently required by the threads;

creating regenerated methods, and replacing references to each method in the selection with references to the regenerated method, wherein said step of creating regenerated methods includes stopping the threads and recreating at an alternate memory address a copy of the methods required by that thread; and, erasing those methods that have not been regenerated, and releasing the portion memory space occupied by the non-regenerated methods.

2. The process of claim 1 wherein the step of determining is used to determine an optimal locking mechanism to be used with the selection of methods.

3. The process of claim 1 wherein the step of erasing uses a stop and copy method of garbage collection.

4. The process of claim 1 wherein the step of erasing uses a mark and sweep method of garbage collection.

5. The process of claim 1 wherein the step of erasing uses a mark and compact method of garbage collection.

6. The process of claim 1 wherein the virtual machine is a component of an application server that comprises:

a computer machine including a processor;

an operating system for communicating between the computer machine and a virtual machine;

a virtual machine, including said original set of methods and said regenerated methods, and threads associated therewith; and, an application server for hosting applications that can use said original set of methods and said regenerated methods provided by the virtual machine.

7. A process for optimizing the distribution of software methods within the memory space of a computer system or virtual machine, comprising the steps of:

determining within a set of methods originally present within the memory space a subset of said methods to be kept, said step of determining includes analyzing the threads to determine those methods currently required by the threads;

creating a copy of the subset of methods to be kept, and patching references to each original method in the subset to the new copy of that method; and, erasing all other methods and releasing the memory space occupied by the erased methods.

8. A computer readable medium including instructions stored therein which when executed by a computer causes the computer to perform the steps of:

optimizing the distribution of methods within the memory space of the computer, further comprising the steps of determining a selection of methods to be regenerated, wherein said step of determining includes analyzing threads to determine the methods currently required by the threads;

creating regenerated methods by recreating at alternate memory addresses the methods required by the threads, and replacing references to each method with references to the regenerated method; and, erasing all non-regenerated methods and releasing the memory space occupied by the non-regenerated methods.

9. The computer readable medium of claim 8 further comprising instructions for stopping the threads prior to recreating the methods, and restarting the threads subsequent to the methods being regenerated.

10. The computer readable medium of claim 8 wherein the step of determining is used to determine an optimal locking mechanism to be used with the method.

11. The computer readable medium of claim 8 wherein the step of erasing uses a stop and copy method of garbage collection.

12. The computer readable medium of claim 8 wherein the step of erasing uses a mark and sweep method of garbage collection.

13. The computer readable medium of claim 8 wherein the step of erasing uses a mark and compact method of garbage collection.

14. The computer readable medium of claim 8 wherein the virtual machine is a component of an application server that comprises:

a computer machine including a processor;

an operating system for communicating between the computer machine and a virtual machine;

a virtual machine, including a number of methods and threads associated therewith; and, an application server for hosting applications that can use the methods provided by the virtual machine.

15. A system, including instructions stored therein which when executed by a computer or virtual machine causes the computer or virtual machine to perform the steps of:

optimizing the distribution of methods within the memory space of the computer system or virtual machine, further comprising the steps of determining a selection of methods to be regenerated, including determining the methods currently required by the computer system or virtual machine;

creating regenerated methods, by recreating at alternate memory addresses the required methods, and replacing references to each method with references to the regenerated method; and, erasing all non-regenerated methods and releasing the memory space occupied by the non-regenerated methods.

16. The system of claim 15 further comprising instructions stored therein for stopping the threads prior to recreating the methods, and restarting the threads subsequent to the methods being regenerated.

17. The system of claim 15 wherein the step of determining is used to determine an optimal locking mechanism to be used with the method.

18. The system of claim 15 wherein the step of erasing uses a stop and copy method of garbage collection.

19. The system of claim 15 wherein the step of erasing uses a mark and sweep method of garbage collection.

20. The system of claim 15 wherein the step of erasing uses a mark and compact method of garbage collection.

21. The system of claim 15 wherein the virtual machine is a component of an application server that comprises:

a computer machine including a processor;

an operating system for communicating between the computer machine and a virtual machine;

a virtual machine, including a number of methods and threads associated therewith; and, an application server for hosting applications that can use the methods provided by the virtual machine.

22. A process for optimizing the distribution of methods within the memory space of a computer system or virtual machine, comprising the steps of:

selecting, from a plurality of original methods, a set of methods to be regenerated;

regenerating the set of methods, including creating a new set of methods copied from the set to be regenerated, and replacing references to the original set of methods with corresponding references to the new set of methods; and erasing all methods in the plurality of original methods that were not regenerated, and releasing the portion of memory space occupied by the non regenerated methods.

23. The process of claim 22 further comprising the steps of:

stopping the threads prior to regenerating the methods, and restarting the threads subsequent to the methods being regenerated.

24. The process of claim 22 wherein the step of selecting is used to determine an optimal locking mechanism to be used with the first set of methods.

25. The process of claim 22 wherein the step of erasing uses a stop and copy method of garbage collection.

26. The process of claim 22 wherein the step of erasing uses a mark and sweep method of garbage collection.

27. The process of claim 22 wherein the step of erasing uses a mark and compact method of garbage collection.

28. The process of claim 22 wherein the virtual machine is a component of an application server that comprises:

a computer machine including a processor;

an operating system for communicating between the computer machine and a virtual machine;

a virtual machine, including the plurality of original and regenerated methods associated therewith; and, an application server for hosting applications that can use the plurality of original and regenerated methods provided by the virtual machine.

* * * * *